US010493408B2

(12) United States Patent
Mahmoud et al.

(10) Patent No.: US 10,493,408 B2
(45) Date of Patent: Dec. 3, 2019

(54) TWO-DIMENSIONAL METAL CARBIDE DESALINATION MEMBRANE

(71) Applicants: Khaled Ahmed Mahmoud, Doha (QA); Yury Gogotsi, Philadelphia, PA (US); Chang Evelyn Ren, Philadelphia, PA (US)

(72) Inventors: Khaled Ahmed Mahmoud, Doha (QA); Yury Gogotsi, Philadelphia, PA (US); Chang Evelyn Ren, Philadelphia, PA (US)

(73) Assignee: Qatar Foundation for Education, Science and Community Development, Doha (QA)

( * ) Notice: Subject to any disclaimer, the term of this patent is extended or adjusted under 35 U.S.C. 154(b) by 0 days.

(21) Appl. No.: 15/527,704

(22) PCT Filed: Nov. 17, 2015

(86) PCT No.: PCT/US2015/061135
§ 371 (c)(1),
(2) Date: May 17, 2017

(87) PCT Pub. No.: WO2016/081486
PCT Pub. Date: May 26, 2016

(65) Prior Publication Data
US 2018/0169591 A1    Jun. 21, 2018

Related U.S. Application Data

(60) Provisional application No. 62/080,967, filed on Nov. 17, 2014.

(51) Int. Cl.
*C02F 1/44* (2006.01)
*B01D 69/02* (2006.01)
(Continued)

(52) U.S. Cl.
CPC ......... *B01D 69/12* (2013.01); *B01D 67/0079* (2013.01); *B01D 69/02* (2013.01);
(Continued)

(58) Field of Classification Search
CPC .... C02F 1/44; C02F 2103/08; B01D 67/0079; B01D 69/12; B01D 71/02; B01D 71/021;
(Continued)

(56) References Cited

U.S. PATENT DOCUMENTS 6,649,255 B1   11/2003   Fain, Sr.
6,761,755 B2   7/2004   Jantsch et al.
(Continued)

FOREIGN PATENT DOCUMENTS

CN        104016345       9/2014
EP        1852176 A1 *   11/2007    ........... A61L 2/0082
(Continued)

OTHER PUBLICATIONS

Naguib et al., "Two-Dimensional Nanocrystals Produced by Exfoliation of $Ti_3AlC_2$", Adv. Mater., 23, 4248-4253, 2011.
(Continued)

*Primary Examiner* — Latosha Hines
(74) *Attorney, Agent, or Firm* — Richard C. Litman; Nath, Goldberg & Meyer

(57) ABSTRACT

The two-dimensional metal carbide desalination membrane includes a stack of two-dimensional metal carbide layers. A two-dimensional metal carbide included in the two-dimensional metal carbide layers may have the formula $Ti_3C_2T_x$, where T represents a terminating functional group, and x represents a number of the terminating functional groups. The terminating group may be oxygen, hydroxide (OH), fluorine or combinations thereof. The two-dimensional metal carbide desalination membrane includes nano-channels which are selectively permeable to ions. The two-
(Continued)

dimensional metal carbide desalination membrane is selectivity permeable to a number of different cations, including $Li^+$, $Na^+$, $K^+$, $Mg^{2+}$, $Ca^{2+}$, $Ni^{2+}$ and $Al^{3+}$, with counter $Cl^-$ anions. Permeation rates depend on the charges of the cations and the ions' hydrated radius, with a critical point around 4.0 Å. The two-dimensional metal carbide desalination membranes can be used as desalination and/or water filtration membranes.

5 Claims, 7 Drawing Sheets

(51) Int. Cl.
*B01D 61/02* (2006.01)
*B01D 69/12* (2006.01)
*B01D 71/38* (2006.01)
*B01D 67/00* (2006.01)
*B01D 71/02* (2006.01)
*B01D 69/14* (2006.01)
*C02F 103/08* (2006.01)
*B01D 61/14* (2006.01)

(52) U.S. Cl.
CPC ......... *B01D 69/148* (2013.01); *B01D 71/021* (2013.01); *B01D 71/022* (2013.01); *B01D 71/38* (2013.01); *C02F 1/44* (2013.01); *B01D 61/02* (2013.01); *B01D 61/14* (2013.01); *B01D 2325/48* (2013.01); *C02F 2103/08* (2013.01); *Y02A 20/131* (2018.01)

(58) Field of Classification Search
CPC ...... B01D 71/022; B01D 71/38; B01D 69/02; B01D 69/148; Y02A 20/131
See application file for complete search history.

(56) References Cited

U.S. PATENT DOCUMENTS

| 2010/0012576 A1 | 1/2010 | Hoffman |
| 2010/0233812 A1 | 9/2010 | Sun et al. |
| 2014/0162130 A1* | 6/2014 | Barsoum ................ C01B 21/06 |
| | | 429/231.8 |

FOREIGN PATENT DOCUMENTS

| EP | 1852176 | 7/2010 |
| WO | 9600125 A1 | 1/1996 |

OTHER PUBLICATIONS

Joshi et al., "Precise and Ultrafast Molecular Sieving Through Graphene Oxide embranes", Science, 343, 752-754, Feb. 2014.
Naguib et al., "25th Anniversary Article: MXenes: A New Family of Two-Dimensional Materials", Adv. Mater., 26, 992-1005, 2014.
Chang E. Ren et al., "Charge- and Size-Selective Ion Sieving Through Ti3C2Tx Mxene Membranes," J. of Phys. Chem. Letters, vol. 6, No. 22, pp. 4026-4031 (2015).

* cited by examiner

TWO-DIMENSIONAL METAL CARBIDE DESALINATION MEMBRANE

TECHNICAL FIELD

The present invention relates to membranes for desalination, water filtration and the like, and particularly to a membrane formed from stacked layers of a two-dimensional metal carbide.

BACKGROUND ART

A large number of water desalination and ion separation processes, such as reverse osmosis (RO), forward osmosis (FO), and membrane distillation (MD), depend on membranes for ion and organic matter removal. Although conventional membranes currently used in the separation industry are typically reliable and exhibit good separation performance, such materials often degrade when exposed to high temperatures and corrosive media (such as $Cl_2$, acids, bases and certain organic compounds). Further, fouling associated with particulate deposition, scaling and biofouling decrease the membranes' permeation rates and ultimately contribute to costly system maintenance. Degradation problems are especially prevalent in the Arabian Gulf, due to high salinity, high turbidity and elevated temperatures of the water. In order to operate in such environments, ultrafast water permeation membranes with good mechanical properties are critical for water purification and desalination.

A membrane should, ideally, be ultrathin (for high flux permeation), mechanically strong to withstand applied pressures, and have tunable pore distributions for excellent selectivity. Recently, nanostructures such as zeolites, metal organic frameworks, ceramics and carbon-based materials have attracted considerable attention as alternative membrane materials, specifically due to their relatively good chemical resistance, high flux, and high rejection rates. However, zeolite membranes have failed to realize economical fabrication on a large scale due to manufacturing costs, reproducibility and defect formation. Further, ceramic membranes are very brittle under high pressures, which limits their practical applications in membrane technologies.

Although it is possible to fabricate high-flux and high selectivity membranes from carbon nanotubes (CNTs), it is currently difficult to synthesize highly aligned and high density CNTs with large lengths. CNTs remain an active area of research for membrane technologies, but costs and operational issues have greatly hindered the development and integration of CNTs into large area membranes. Graphene oxide (GO) nano-sheets (i.e., sheets of two-dimensional material) have emerged recently as a new class of ultrathin, high-flux and energy-efficient sieving membranes. However, despite the great potential of nano-porous GO membranes, scalable production has been hindered by difficulties in fabricating large-area uniform GO membranes by spin coating and vacuum filtration techniques. Further, experimental studies have failed thus far to confirm theoretical predictions of orders of magnitude improvement in the membranes' selectivity and permeability when compared to current state-of-the-art filtration. Transport measurements through graphene have been limited to microscopic areas with few pores or multilayered graphene-oxide. Experimental findings in GO membranes showed that molecules travel a tortuous path through the interlayer region between flakes, and while such membranes have demonstrated selective transport, the measured permeability does not match the expected performance of porous single-layer graphene due to this longer path length.

Thus, a two-dimensional metal carbide desalination membrane addressing the aforementioned problems is desired.

DISCLOSURE OF INVENTION

The two-dimensional metal carbide desalination membrane is formed from a stack of two-dimensional metal carbide layers. The two-dimensional metal carbide layers can include a two-dimensional metal carbide having the formula $Ti_3C_2T_x$, where T represents a terminating functional group, and x represents a number of the terminating functional groups. The terminating group may be oxygen, hydroxide (OH), fluorine or combinations thereof. The two-dimensional metal carbide desalination membrane can include nano-channels which are selectively permeable to ions. The two-dimensional metal carbide desalination membrane can be permeable to molecules, gases and water, with specific selectivity to a number of different cations, including $Li^+$, $Na^+$, $K^+$, $Mg^{2+}$, $Ca^{2+}$, $Ni^{2+}$ and $Al^{3+}$, with counter $Cl^-$ anions. Permeation rates can depend on the charges of the cations and the ions' hydrated radius, with a critical point being around 4.0 Å. The two-dimensional metal carbide desalination membranes may be used as desalination and/or water filtration membranes. The two-dimensional metal carbide desalination membranes can be flexible. The two-dimensional metal carbide desalination membranes can have relatively high mechanical strength, hydrophilic surfaces, and relatively high conductivity.

The two-dimensional metal carbide desalination membrane can include layers having a composite of the two-dimensional metal carbide and a polymer, such as polyvinyl alcohol. The stack of two-dimensional metal carbide layers or two-dimensional metal carbide-polymer composite layers may be supported on a polymeric filtering substrate, such as a polyvinylidene fluoride (PVDF) supporting substrate.

These and other features of the present invention will become readily apparent upon further review of the following specification and drawings.

BRIEF DESCRIPTION OF THE DRAWINGS

Similar reference characters denote corresponding features consistently throughout the attached drawings.

BEST MODES FOR CARRYING OUT THE INVENTION

Figure 1A:
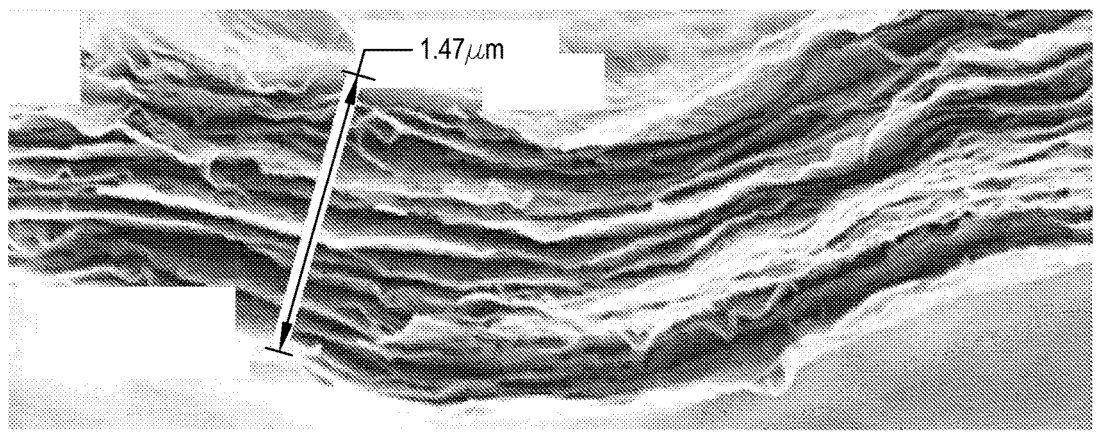
FIG. 1A is a scanning electron micrograph of a cross-section of a two-dimensional metal carbide desalination membrane including layers of a two-dimensional metal carbide, according to the present invention.

The two-dimensional metal carbide desalination membrane can include a plurality of two-dimensional metal carbide layers. The plurality of two-dimensional metal carbide layers can include a two-dimensional metal carbide, such as MXene. Preferably, the MXene included in the plurality of two-dimensional metal carbide layers has the formula $Ti_3C_2T_x$, where T represents a terminating functional group (O, OH and/or F) and x represents the number of terminating groups. The two-dimensional metal carbide desalination membrane can include nano-channels with specific selectivity to a number of different cations, including $Li^+$, $Na^+$, $K^+$, $Mg^{2+}$, $Ca^{2+}$, $Ni^{2+}$ and $Al^{3+}$, with counter $Cl^-$ anions.

The two-dimensional metal carbide desalination membrane can be formed from layers of a composite of the two-dimensional metal carbide and a polymer, such as polyvinyl alcohol. A stack of two-dimensional metal carbide layers or two-dimensional metal carbide-polymer composite layers may be supported on a polymeric filtering substrate, such as a polyvinylidene fluoride (PVDF) supporting substrate.

The two-dimensional metal carbide desalination membrane can have relatively high selectivity to ions and robust mechanical stability. As such, the two-dimensional metal carbide desalination membrane can be used for water desalination and/or water filtration applications. The two-dimensional metal carbide desalination membrane can have a thickness of from about 1 μm to about 2 μm, e.g., 1.3 μm to about 1.8 μm. Preferably, the two-dimensional metal carbide desalination membrane has a thickness of about 1.5 μm. The two-dimensional metal carbide desalination membranes can be flexible, have relatively high mechanical strength, have hydrophilic surfaces, and have relatively high conductivity. The two-dimensional metal carbide desalination membrane or layered structure can form nano-channels which are permeable to ions, molecules, gases and water, but with specific selectivity to a number of different cations, including $Li^+$, $Na^+$, $K^+$, $Mg^{2+}$, $Ca^{2+}$, $Ni^{2+}$ and $Al^{3+}$, with counter $Cl^-$ anions. Permeation rates can rely on the ions' hydrated radius, with a critical point around 4.0 Å, and on the charges of the cations. The interlayer spacing parameter of the MXene layers and the negative charges on the MXene surfaces can affect the permeation of ions. For example, the interlayer spacings for dry and wet $Ti_3C_2T_x$ membranes can be about 7.98 and 11.98 Å, respectively.

MXene can have the general formula $M_{n+1}X_n$ where M represents a transition metal (such as titanium, vanadium, chromium, niobium), X is carbon and/or nitrogen, and n ranges between 1 and 3. MXene is produced by etching the element A layer from MAX phases with a composition of $M_{n+1}AX_n$, where A represents a group A element (aluminum, silicon, tin, indium, etc.). MAX phases are a large family of hexagonal-layered ternary transition metal carbides and/or nitrides. The etching process is carried out by immersing the MAX phase in hydrofluoric acid at room temperature. Using a vacuum-assisted filtration process, the two-dimensional metal carbides may be layered to produce membranes having thicknesses on the order of hundreds of nanometers to several micrometers.

The present inventors have examined the permeation of metal cations ($Li^+$, $Na^+$, $K^+$, $Mg^{2+}$, $Ca^{2+}$, $Ni^{2+}$ and $Al^{3+}$) with counter $Cl^-$ anions and of acid blue dye molecules through $Ti_3C_2T_x$ membranes. In order to increase mechanical stabilities of the $Ti_3C_2T_x$ membranes in an aqueous environment, $Ti_3C_2T_x$/polymer membranes were also prepared. When compared to the $Ti_3C_2T_x$ membranes, $Ti_3C_2T_x$/polymer membranes showed equal or even better selectivity. As will be discussed in detail below, both the $Ti_3C_2T_x$ membranes and the $Ti_3C_2T_x$/polymer membranes performed better than graphene oxide (GO) membranes, which were prepared and tested under the same conditions. As will be further discussed in detail below, based on the interlayer spacing parameter from several density functional theory (DFT) calculation reports, and charge intercalation theory, a mechanism of ion transport through the $Ti_3C_2T_x$ membranes was determined.

Figure 1B:
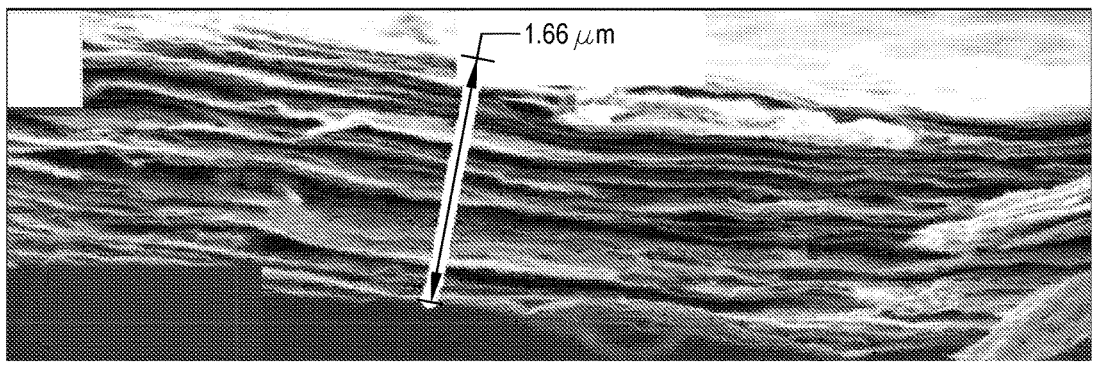
FIG. 1B is a scanning electron micrograph of a cross-section of a two-dimensional metal carbide desalination membrane including layers of a composite of a two-dimensional metal carbide and a polyvinyl alcohol (PVA).

The thickness of the $Ti_3C_2T_x$ membranes being tested was controlled between 1.3 and 1.8 μm, with most of the test membranes having a thickness of about 1.5 μm. FIG. 1A is a scanning electron micrograph of a cross-section of a $Ti_3C_2T_x$ membrane, formed from stacked $Ti_3C_2T_x$ layers having an overall thickness of approximately 1.47 μm and a mass of approximately 5 mg. FIG. 1B is a scanning electron micrograph of a cross-section of a $Ti_3C_2T_x$/polyvinyl alcohol (PVA) composite membrane, having an overall thickness of approximately 1.66 m and a mass of approximately 5.6 mg. Both membranes showed high solvent permeability. No permeation of acid blue dye molecules through the membranes was detected by conductivity probe after a 24 hour test, showing that no pinholes existed in the membranes.

In order to obtain smooth and orderly stacked $Ti_3C_2T_x$ laminates, dilute colloidal $Ti_3C_2T_x$ suspensions for filtration were provided. In particular, dilute concentrations as low as 0.01 mg/ml were used, resulting in a long filtration time of approximately four hours. The smoothness and ordered stacking of nano-sheet layers is important since it ensures formation of uniform two-dimensional nano-channels which are selective to water molecules and ions, and also exhibit robust integrity in water. Additionally, the membranes may be mounted on a supporting substrate, such as a polyvinylidene fluoride (PVDF) supporting substrate. Due to the relatively high pressure exerted on $Ti_3C_2T_x$ membranes in use as desalination and filtration membranes, commercial polyvinylidene fluoride membranes with a pore size of 450 nm were used as supporting substrates. Pure PVDF membranes typically show no hindering effect on molecules, even molecules as big as acid blue, which are larger than any ions or molecules used in the experiment. Thus, the PVDF supporting membrane does not affect the $Ti_3C_2T_x$ membrane's selectivity to ions and molecules. Table 1 below shows permeation of a pure PVDF membrane compared with permeation of a $Ti_3C_2T_x$/PVDF membrane as a function of time.

TABLE 1

Comparison of Permeation of PVDF Membrane
and $Ti_3C_2T_x$/PVDF Membrane

| | Permeation Conductivity (μS/cm) | |
|---|---|---|
| Time (hours) | PVDF Acid Blue (137.6 μS/cm) | $Ti_3C_2T_x$/PVDF Acid Blue (137.6 μS/cm) |
| 1 | 18.5 | 1.9 |
| 2 | 33.8 | 3.8 |
| 3 | 56.1 | 5.3 |
| 4 | 70.2 | 7.1 |
| 24 | — | 29 |

Figure 2A:
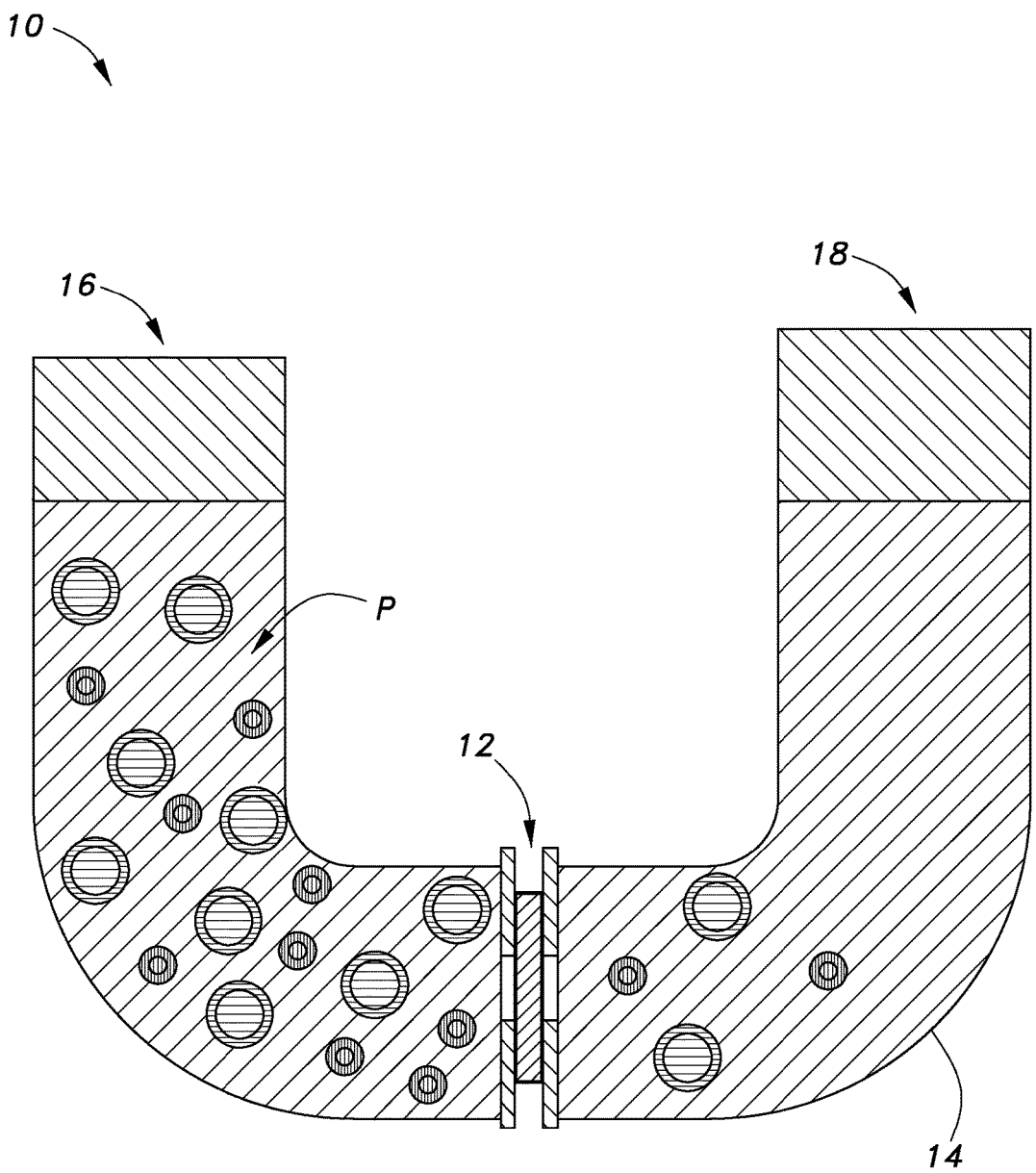
FIG. 2A diagrammatically illustrates an experimental device for testing permeability of the two-dimensional metal carbide desalination membrane.
Figure 2B:
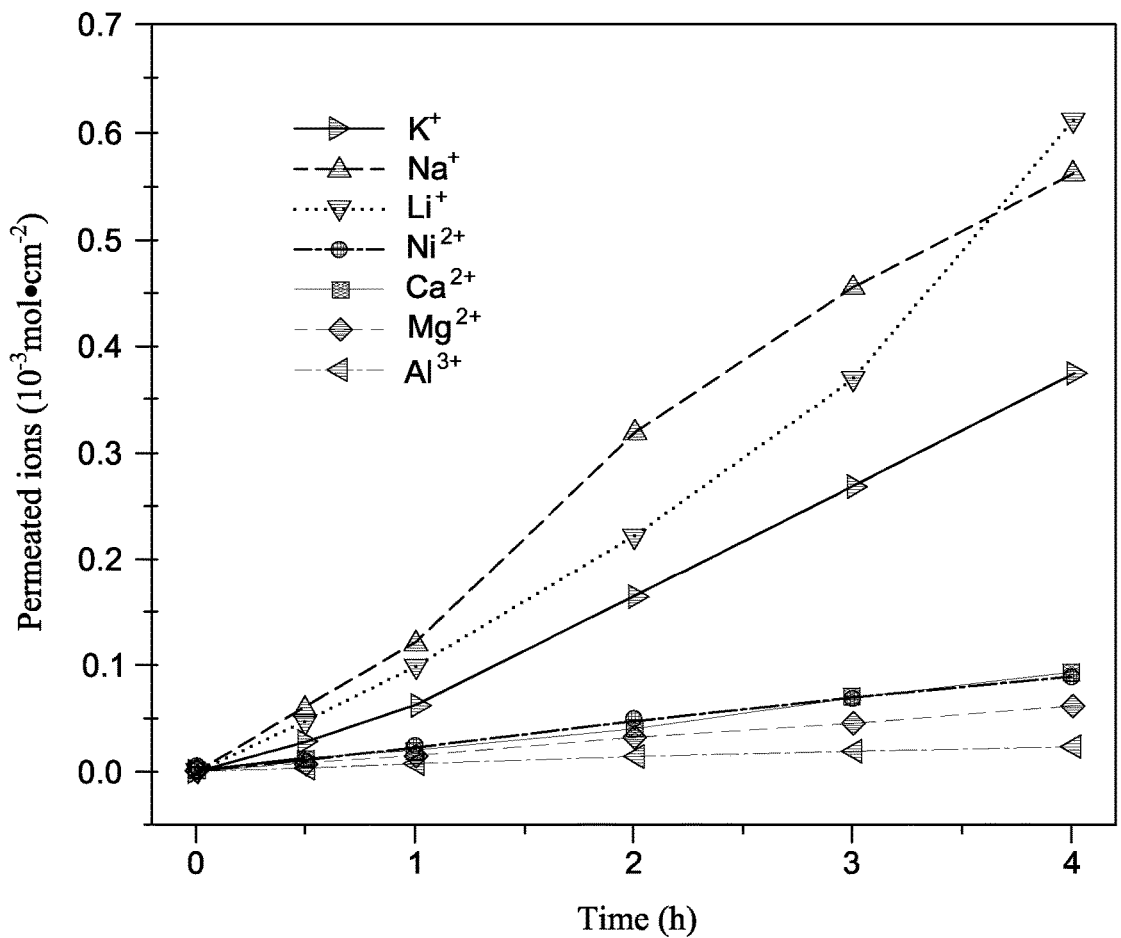
FIG. 2B is a graph showing permeability measurements as a function of time for cation permeation across the two-dimensional metal carbide desalination membrane, comparing permeability for $Na^+$, $Li^+$, $K^+$, $Ca^{2+}$, $Ni^{2+}$, $Mg^{2+}$, and $Al^{3+}$.

The $Ti_3C_2T_x$ membrane with the PVDF substrate was assembled into a U-shaped testing device 10, as shown in FIG. 2A, for studying the ionic conductivity of permeate solution. The $Ti_3C_2T_x$/PVDF membrane 12 was placed centrally within the U-shaped housing 14, dividing the U-shaped housing 14 into a feed compartment 16 and a permeate compartment 18. Ionic conductivity of the permeate solution P was measured and converted to salt concentrations based on molar conductivity. The cation concentrations were obtained assuming that cations and anions move through membranes in stoichiometric amounts, and were plotted as a function of time, reflecting the permeability of the cations under investigation. For all salt solutions studied, the cation concentrations' permeation increased linearly with time, with increasing rates following the progression of $Na^+ \rightarrow Li^+ \rightarrow K^+ \rightarrow Ca^{2+} \rightarrow Ni^{2+} \rightarrow Mg^{2+} \rightarrow Al^{3+}$. FIG. 2B shows permeated ion concentration across membrane 12 as a function of time for each of the salt solutions under investigation, with 0.2 M feed solutions, all with counter $Cl^-$ anions. In the experiment, a 50 mL sample of each aqueous solution (0.2 mol/L in deionized water) was injected with the same speed into the feed compartment 16. Magnetic stirring was used in the permeation compartment 18 to ensure no concentration gradients. The conductivity in the permeation compartment 18 was recorded with increasing permeation time.

Figure 3:
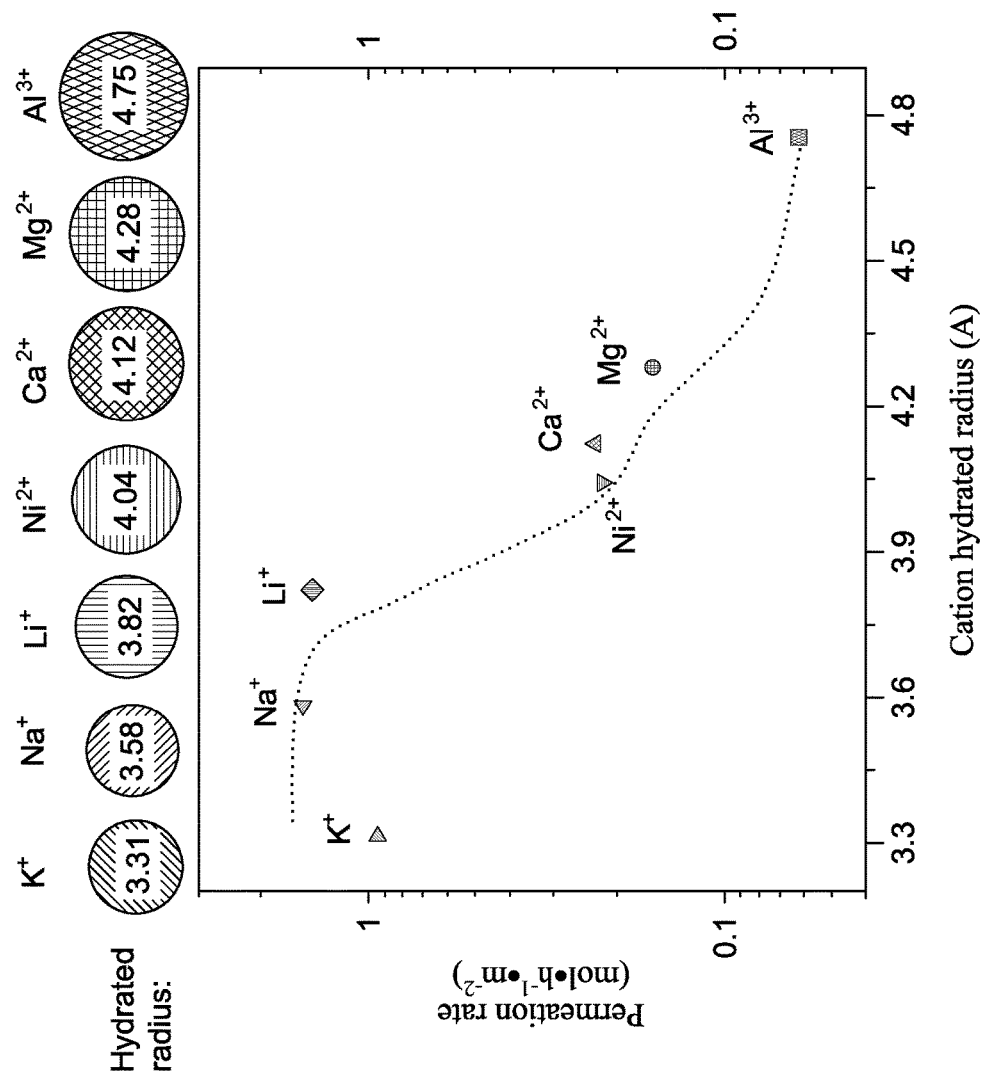
FIG. 3 is a graph showing selective permeation of $Na^+$, $Li^+$, $K^+$, $Ca^{2+}$, $Ni^{2+}$, $Mg^{2+}$ and $Al^{3+}$ cations through the two-dimensional metal carbide desalination membrane as a function of cation hydrated radius.

In order to examine cation selectivity of the two-dimensional metal carbide desalination membranes, the cations' permeation rates were compared against their sizes and charges, as shown in FIG. 3 and in Table 2 below. FIG. 3 shows the selective permeation rate through a 1.5 m thick $Ti_3C_2T_x$ membrane with counter $Cl^-$ anions, shown as a function of cation hydrated radius.

TABLE 2

Permeation Rates for Differing Cations

| Solutions | $K^+$ | $Na^+$ | $Li^+$ | $Ni^{2+}$ | $Ca^{2+}$ | $Mg^{2+}$ | $Al^{3+}$ |
|---|---|---|---|---|---|---|---|
| Permeation Rates (mol/h/m²) | 0.94 | 1.53 | 1.40 | 0.22 | 0.23 | 0.16 | 0.06 |

The effective volume occupied by a cation in water is characterized by its hydrated radius. The smaller species permeate with similar speeds, whereas larger ions exhibit much smaller permeation speeds. The permeation curves can be classified with similar permeation rates. Three separate groups, including $Na^+$, $Li^+$ and $K^+$; $Ca^{2+}$, $Ni^{2+}$ and $Mg^{2+}$; and $Al^{3+}$. $Na^+$ ions, have the largest permeation rate of 1.53 mol/h/m², which is about 25 times faster than that of $Al^{3+}$ ions. It was noted that, with regard to the selectivity, there is a cut-off trend of permeation around 4.0 Å, indicating cations larger than this size were sieved out. Thus, $Ti_3C_2T_x$ membranes are shown as being selective towards ions of different size and/or charge, such as $Li^+$, $Na^+$, $K^+$, $Mg^{2+}$, $Ca^{2+}$, $Ni^{2+}$ and $Al^{3+}$.

Figure 4A:
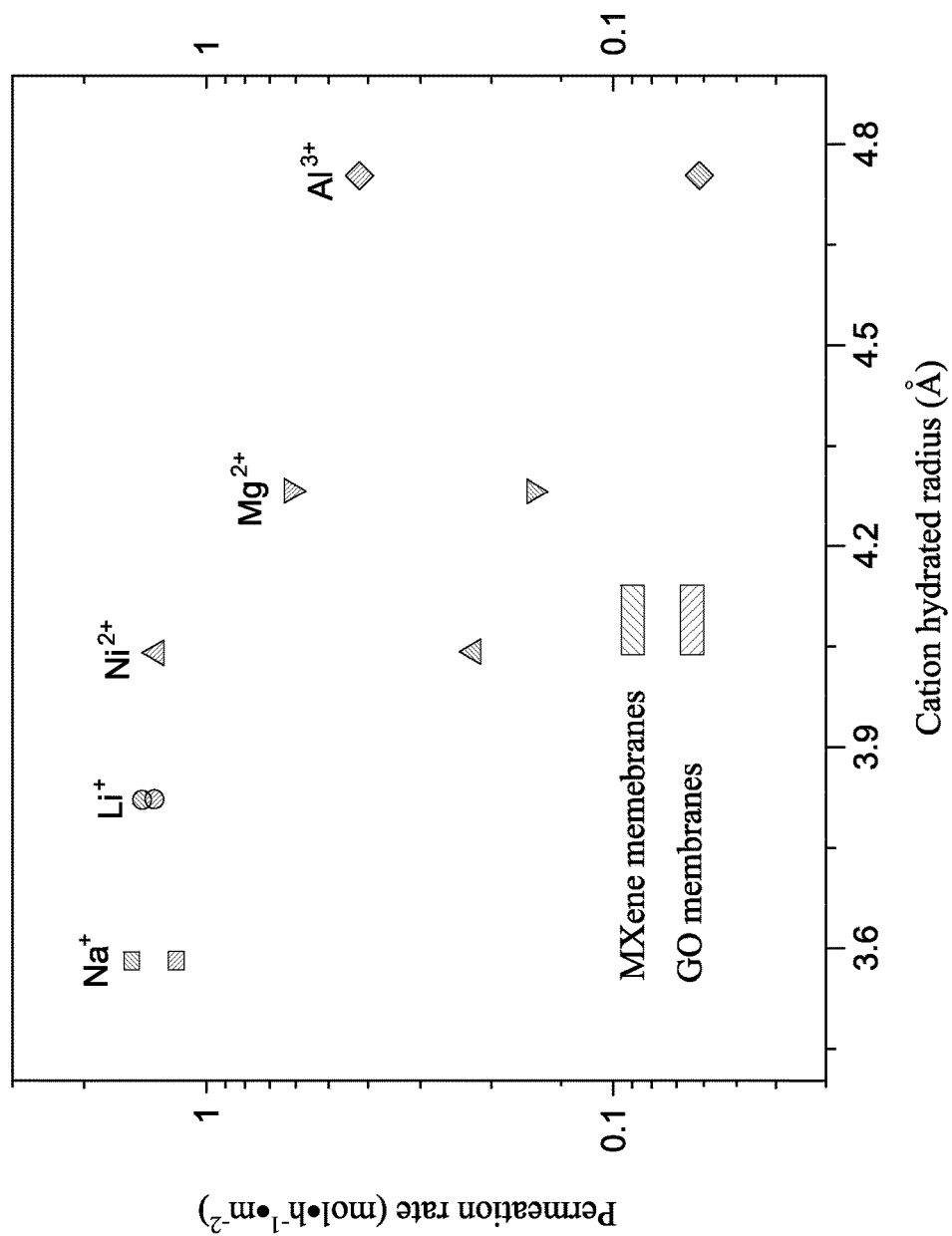
FIG. 4A is a graph showing a selective permeation comparison between the two-dimensional metal carbide desalination membrane of FIG. 1A and a conventional graphene oxide (GO) membrane as a function of cation hydrated radius.
Figure 4B:
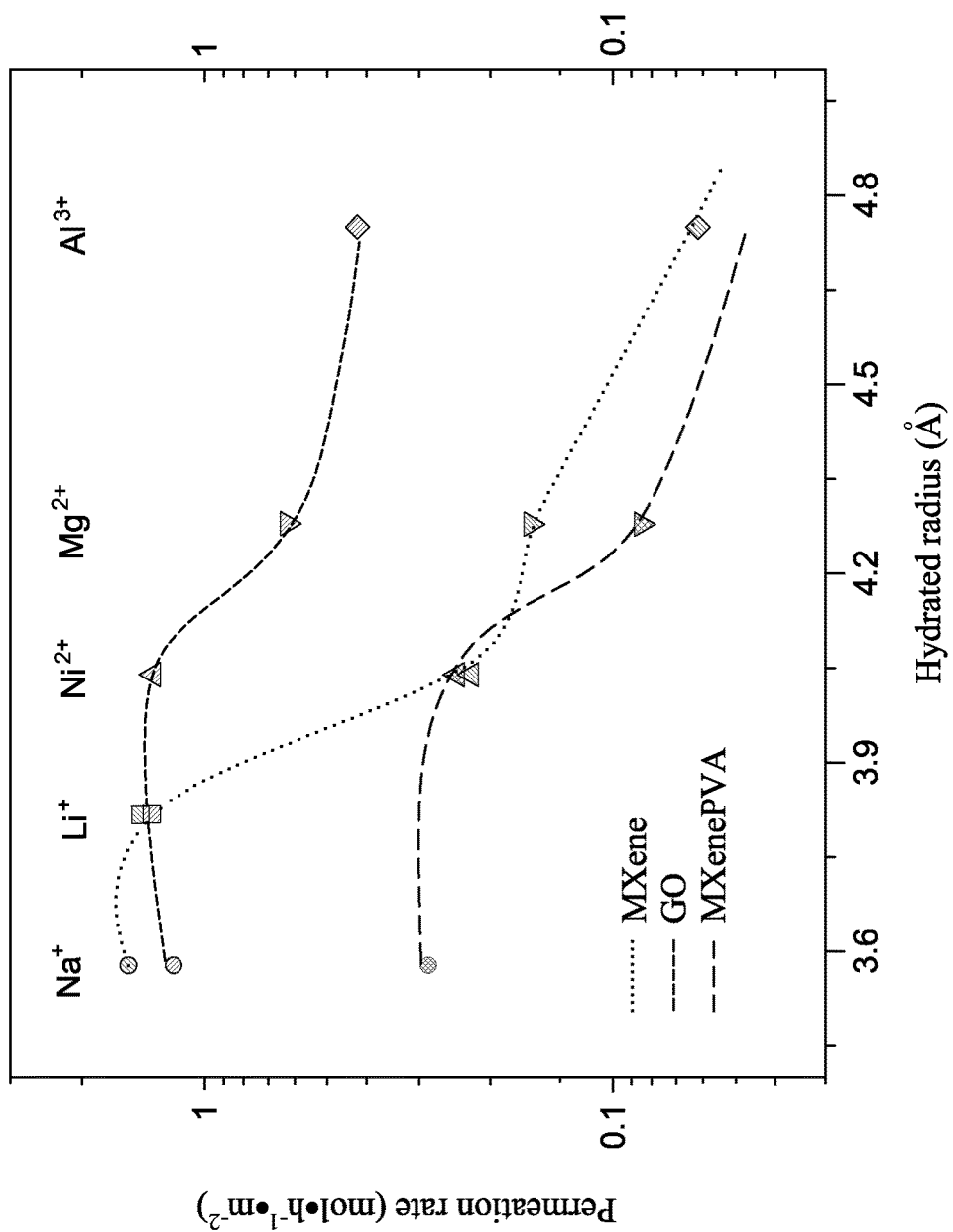
FIG. 4B is a graph showing a selective permeation comparison between the two-dimensional metal carbide desalination membrane of FIG. 1A, the two-dimensional metal carbide desalination membrane of FIG. 1B, and the conventional graphene oxide (GO) membrane as a function of cation hydrated radius.

FIG. 4A shows the results of a selective permeation comparison between an MXene-based membrane ($Ti_3C_2T_x$) and a conventional graphene oxide (GO) membrane as a function of cation hydrated radius. FIG. 4B shows the results of a selective permeation comparison between the MXene-based membrane, an MXene/PVA-based membrane ($Ti_3C_2T_x$/PVA) and the conventional graphene oxide (GO) membrane as a function of cation hydrated radius. With respect to the conventional GO membrane, the two-dimensional metal carbide desalination membrane is highly hydrophilic with a contact angle of 35° against water and has sufficient mechanical strength for handling.

The tensile strength of a MXene film having a thickness on the order of 3.3 m is about 22 MPa, with a Young's modulus of 3.5 GPa, both of which can be further improved with polymer additives. A comparison between a 2.5 μm thick GO membrane and a 3.3 μm MXene-based membrane is summarized below in Table 3.

TABLE 3

Comparison of Mechanical Properties

| Properties | GO | MXene |
|---|---|---|
| Contact Angle (°) | 33.7 | 35 |
| Conductivity (S/m) | Insulator (~6.8 × 10⁻⁸) | 240,238 ± 3,500 |
| Young's Modulus (GPa) | 30 | 3.5 |
| Tensile Strength (MPa) | 55 | 22 |

Figure 5:
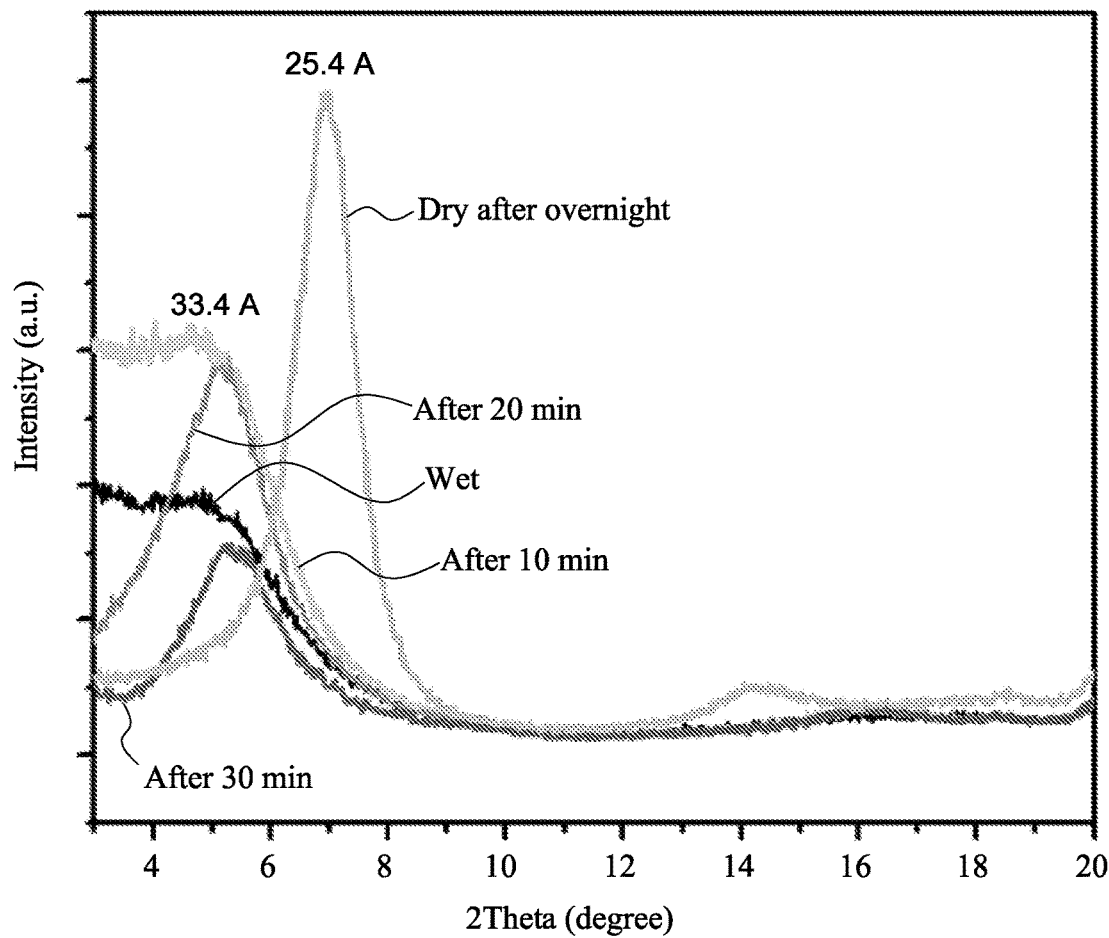
FIG. 5 shows X-ray diffraction patterns of the two-dimensional metal carbide desalination membrane of FIG. 1A in both a wet state and a dry state, both before and after permeation of $MgCl_2$.

FIG. 5 shows X-ray diffraction patterns of $Ti_3C_2T_x$ membranes in both a wet state and a dry state, both before and after permeation of $MgCl_2$. The transport mechanisms through $Ti_3C_2T_x$ membrane films can be size and charge selective due to the presence of interlayer slit pores and negative charges on hydrophilic $Ti_3C_2T_x$-based film surfaces. $Ti_3C_2T_x$ flakes are negatively charged, which leads to absorption of cations and repulsion of anions. This results in $Ti_3C_2T_x$'s selectivity to ions with different charges, in addition to sizes. Further, the $Ti_3C_2T_x$ nano-layer sheets have been separated into two types of regions: functionalized and origin, similar to the regions of conventional GO nanosheets. The functional groups (OH, O, F) on the $Ti_3C_2T_x$ surface may act as spacers to support nano-sheet interlayer spacing, as well as acting as hurdles to impede the transportation of ions. The origin regions form the network of capillaries that allow or hinder the flow of water or ions. First principle calculations models predict that the interlayer spacing separated from $Ti_3C_2T_x$ layers is about 10-11.5 Å. The XRD patterns of $Ti_3C_2T_x$ show a c-Lp of 25.4 Å at the dry state in air and 33.4 Å at the wet state, which includes two sets of a rigid $Ti_3C_2$ layers plus an interlayer spacing. From molecular dynamics (MD) simulations, one rigid layer of $Ti_3C_2$ has a thickness of 4.72 Å. Thus, from calculations and a combination of XRD and simulations, the interlayer spacings for dry and wet $Ti_3C_2T_x$ membranes are about 7.98 and 11.98 Å, respectively.

In order to make the $Ti_3C_2T_x$ membrane, a $Ti_3C_2T_x$ colloidal solution is first prepared. So as to obtain few- and/or single-layer flakes, Ml-$Ti_3C_2T_x$ powders are first delaminated by ultrasonication. In experiment, the Ml-$Ti_3C_2T_x$ powders were obtained from etching $Ti_3AlC_2$ powder with LiF/HCl solution. Then, the produced Ml-$Ti_3C_2T_x$ powder is dispersed in deaerated water with a weight ratio of Ml-$Ti_3C_2T_x$:water of 250:1. The suspension is sonicated under flowing Ar for 1 hour, and then centrifuged at 3500 rpm for 1 hour to obtain the supernatant containing $Ti_3C_2T_x$ flakes, thus producing the $Ti_3C_2T_x$ colloidal solution.

In order to prepare the $Ti_3C_2T_x$/PVA composite, the $Ti_3C_2T_x$ colloidal solution was mixed with a PVA having a molecular weight of 115,000 in aqueous solution. Specifically, aqueous solutions of $Ti_3C_2T_x$ (~0.3 mg mL$^{-1}$) and PVA (0.1 wt %) were mixed and the mixture was sonicated in a water bath for 15 min. The $Ti_3C_2T_x$ to PVA weight ratios chosen were 90:10. In all cases, the mass of the starting $Ti_3C_2T_x$ was 5±0.1 mg.

In order to prepare the $Ti_3C_2T_x$-based membrane supported on PVDF, the $Ti_3C_2T_x$ and its polymer composite solutions were diluted to 0.01 mg mL$^{-1}$ (i.e., the concentration of $Ti_3C_2T_x$ in solution). The films were fabricated via vacuum-assisted filtration (VAF) of the diluted solutions through a PVDF substrate, which was hydrophilic and had a pore size of approximately 0.45 μm, with a diameter of 47 mm. A glass microfiltration apparatus, with a fritted alumina supported base, was used for the vacuum filtration. The filtered films were air dried on the PVDF filter substrate.

In the above, the measured ionic conductivity variation of each permeate solution was converted to ion concentrations based on molar conductivity calculations. Molar conductivity is defined as the conductivity of an electrolyte solution divided by the molar concentration of the electrolyte, which is given by: $\Lambda_m = \kappa/c$, where $\kappa$ is the measured conductivity, and c is the electrolyte concentration. Thus, the electrolyte concentration can be obtained as $c = \kappa/\Lambda_m$, in which the ionic conductivity of all of the salt solutions can be found in standard references. Then, the ion permeation rate (J) was calculated by the classical diffusion equation:

$$J = \frac{V_{eff} \cdot \Delta C}{A_{eff} \cdot t},$$

where $V_{eff}$ is the effective volume of the solution on permeate side; $\Delta C$ is the concentration gradient across the membrane; $A_{eff}$ is the effective area of the MXene-based membrane, and t is the diffusion time.

With regard to the characterizations described above, a scanning electron microscope (SEM) was used to study the morphology of the produced flakes and films. Elemental analysis was conducted using an energy dispersive X-ray (EDX) spectrometer. A transmission electron microscope (TEM) operating at 200 kV was used to obtain images of the $Ti_3C_2T_x$ flakes and the $Ti_3C_2T_x$/PVA films. The $Ti_3C_2T_x$ flakes for TEM were prepared by dropping the colloidal solution on a lacey carbon-coated copper grid. The $Ti_3C_2T_x$/PVA cross-sections were produced by first embedding the films in epoxy resin and then cutting them using a glass microtome. The produced chips were placed on a lacey carbon-coated copper grid.

It is to be understood that the present invention is not limited to the embodiments described above, but encompasses any and all embodiments within the scope of the following claims.

We claim:

1. A two-dimensional metal carbide desalination membrane, comprising: a polymer substrate, a plurality of stacked, two-dimensional metal carbide layers, each of the two-dimensional metal carbide layers being hydrophilic and including a two-dimensional metal carbide having the formula $Ti_3C_2T_x$, wherein T represents a terminal functional group, and x represents the number of the terminal functional groups, wherein two-dimensional, carbide layers are configured to define uniform two dimensional nano-channels, orderly stacked and with an overall thickness of between 1 um-2 um, thereby being permeable to ions, molecules, gases and water, further wherein the stacked, two-dimensional metal carbide layers are layered on the polymer substrate.

2. The two-dimensional metal carbide desalination membrane as recited in claim 1, wherein the terminal functional group comprises at least one functional group selected from the group consisting of oxygen, hydroxide (OH), and fluorine.

3. A two-dimensional metal carbide desalination membrane, comprising a comprising a plurality of stacked, two-dimensional, carbide-polymer composite layers, each of the two-dimensional metal carbide layers being hydrophilic and including a two-dimensional metal carbide having the formula $Ti_3C_2T_x$, wherein T represents a terminal functional group and x represents the number of the terminal functional groups, wherein two-dimensional, carbide-polymer composite layers are configured to define uniform two dimensional nano-channels, orderly stacked and with an overall thickness of between 1 um-2 um.

4. The two-dimensional metal carbide desalination membrane according to claim 1, wherein the polymer substrate comprises polyvinylidene fluoride (PVDF).

5. The two-dimensional metal carbide desalination membrane as recited in claim 3, wherein the polymer comprises polyvinyl alcohol.

* * * * *